(12) United States Patent
Hansen et al.

(10) Patent No.: US 12,478,130 B2
(45) Date of Patent: Nov. 25, 2025

(54) FOOTWEAR INJECTION MOULD

(71) Applicant: ECCO Sko A/S, Bredebro (DK)

(72) Inventors: Jakob Moller Hansen, Bredebro (DK); Jens Sonne Mortensen, Bredebro (DK)

(73) Assignee: ECCO Sko A/S, Bredebro (DK)

( * ) Notice: Subject to any disclaimer, the term of this patent is extended or adjusted under 35 U.S.C. 154(b) by 35 days.

(21) Appl. No.: 17/636,334

(22) PCT Filed: Aug. 19, 2020

(86) PCT No.: PCT/DK2020/050235
§ 371 (c)(1),
(2) Date: Feb. 17, 2022

(87) PCT Pub. No.: WO2021/032260
PCT Pub. Date: Feb. 25, 2021

(65) Prior Publication Data
US 2022/0279893 A1    Sep. 8, 2022

(30) Foreign Application Priority Data
Aug. 19, 2019 (EP) ..................................... 19192265

(51) Int. Cl.
*A43B 9/16* (2006.01)
*B29D 35/06* (2010.01)
*B29D 35/12* (2010.01)

(52) U.S. Cl.
CPC .............. *A43B 9/16* (2013.01); *B29D 35/061* (2013.01); *B29D 35/128* (2013.01)

(58) Field of Classification Search
CPC ........................... B29D 35/061; B29D 35/128
See application file for complete search history.

(56) References Cited

U.S. PATENT DOCUMENTS

| 696,246 A | 3/1902 | Kosters |
| 1,163,630 A | 12/1915 | Anderson |
(Continued)

FOREIGN PATENT DOCUMENTS

| AU | 419135 B2 | 11/1971 |
| AU | 2016204359 | 1/2018 |
(Continued)

OTHER PUBLICATIONS

Chunlei, Chai "Business Innovation Design", Huazhong University of Science and Technology Press, Jun. 30, 2014, 4 pages.
(Continued)

*Primary Examiner* — Galen H Hauth
(74) *Attorney, Agent, or Firm* — Lee & Hayes, P.C.

(57) ABSTRACT

A footwear injection mold includes a secondary injection mold defining at least part of an injection chamber. The injection chamber includes a proximal surface defining a part of a distal surface of a footwear part. The secondary injection mold includes a protrusion having an upper contacting surface, a proximal end, a primary surface faced away from the injection chamber, and a secondary surface facing the injection chamber. A normal of the upper contacting surface intersects a center point of the upper contacting surface. A protrusion plane is defined by the normal of the upper contacting surface along a width of the protrusion, and defines a boundary between a primary half and a secondary half of the protrusion, the primary half arranged between the protrusion plane and the primary surface, and the secondary half arranged between the protrusion plane and the secondary surface. A height of the proximal end of the protrusion is larger than the height of the upper contacting surface of the protrusion, relative to the normal of the upper contacting surface.

18 Claims, 7 Drawing Sheets

(56) References Cited

U.S. PATENT DOCUMENTS

| | | | |
|---|---|---|---|
| 1,460,358 A | 6/1923 | Krentler | |
| 3,314,173 A | 4/1967 | Szerenyi | |
| 3,317,940 A | 5/1967 | Herbert | |
| 3,319,301 A * | 5/1967 | Ludwig | B29D 35/081 264/328.8 |
| 3,501,793 A | 3/1970 | Jonas | |
| 3,601,831 A | 8/1971 | Daum | |
| 3,677,679 A | 7/1972 | Christie et al. | |
| 5,871,683 A | 2/1999 | Schaper et al. | |
| 5,881,413 A | 3/1999 | Throneburg et al. | |
| 6,132,663 A | 10/2000 | Johnson | |
| 10,293,565 B1 | 5/2019 | Tran | |
| 2001/0020222 A1 | 9/2001 | Lee et al. | |
| 2005/0071935 A1 | 4/2005 | Shah et al. | |
| 2005/0144034 A1 | 6/2005 | Hunter | |
| 2007/0193068 A1 | 8/2007 | Calvano et al. | |
| 2007/0240338 A1 | 10/2007 | Din Mahamed | |
| 2009/0072436 A1 | 3/2009 | Dean | |
| 2014/0277658 A1 | 9/2014 | Hanft | |
| 2015/0298413 A1 | 10/2015 | Yang | |
| 2016/0107391 A1 | 4/2016 | Parish et al. | |
| 2016/0166010 A1 | 6/2016 | Bruce et al. | |
| 2016/0360823 A1 | 12/2016 | Garbujo et al. | |
| 2017/0095036 A1 | 4/2017 | Chen | |
| 2017/0197345 A1 | 7/2017 | Okamoto | |
| 2017/0202309 A1 | 7/2017 | Sterman et al. | |
| 2017/0238659 A1 | 8/2017 | Bohnsack et al. | |
| 2017/0239909 A1 | 8/2017 | Janney et al. | |
| 2017/0306539 A1 | 10/2017 | Gladish | |
| 2018/0317606 A1 | 11/2018 | Schneider | |
| 2019/0073709 A1 * | 3/2019 | Hayes | B22F 5/007 |
| 2019/0152149 A1 | 5/2019 | Arayama | |
| 2019/0153149 A1 | 5/2019 | Toba | |
| 2019/0344519 A1 | 11/2019 | Lin et al. | |
| 2022/0152962 A1 | 5/2022 | Hansen et al. | |
| 2023/0189938 A1 | 6/2023 | Hansen | |

FOREIGN PATENT DOCUMENTS

| | | |
|---|---|---|
| CN | 1475340 A | 2/2004 |
| CN | 101557925 A | 10/2009 |
| CN | 102414013 A | 4/2012 |
| CN | 102596551 A | 7/2012 |
| CN | 202592652 U | 12/2012 |
| CN | 203665868 U | 6/2014 |
| CN | 203697349 U | 7/2014 |
| CN | 105495863 A | 4/2016 |
| CN | 106103035 A | 11/2016 |
| CN | 205869403 | 1/2017 |
| CN | 206170682 | 5/2017 |
| CN | 206568446 U | 10/2017 |
| CN | 207011808 U | 2/2018 |
| CN | 108158134 A | 6/2018 |
| CN | 108673919 A | 10/2018 |
| CN | 213618060 U | 7/2021 |
| DE | 2721443 A1 | 11/1978 |
| DE | 10319593 | 11/2003 |
| DK | 202070841 A1 | 6/2022 |
| EP | 0313312 A2 | 4/1989 |
| EP | 2110037 A1 | 10/2009 |
| ES | 2653974 B2 | 10/2018 |
| FR | 1414588 A | 10/1965 |
| FR | 2572324 B4 | 12/1986 |
| GB | 1075256 A | 7/1967 |
| GB | 1083199 | 9/1967 |
| GB | 1197727 A | 7/1970 |
| GB | 1504232 | 3/1978 |
| GB | 2105252 | 3/1983 |
| JP | 2004090998 | 3/2004 |
| JP | 2016097116 A | 5/2016 |
| JP | 2016198496 A | 12/2016 |
| JP | 2018194945 | 12/2018 |
| KR | 20020096188 | 12/2002 |
| KR | 100737426 | 7/2007 |
| KR | 20170089514 | 8/2017 |
| TW | 587014 B | 5/2004 |
| WO | WO-02070239 A1 * | 9/2002 ......... B29D 35/0045 |
| WO | WO2007126184 | 11/2007 |
| WO | WO2008049430 | 5/2008 |
| WO | WO2010136855 | 12/2010 |
| WO | WO2011049306 | 4/2011 |
| WO | WO2013143541 | 10/2013 |
| WO | 2015033272 A1 | 3/2015 |
| WO | WO2016196995 | 12/2016 |
| WO | 2019219532 A1 | 11/2019 |
| WO | 2020011514 A1 | 1/2020 |
| WO | 2020182260 A1 | 9/2020 |
| WO | WO2020182259 | 9/2020 |
| WO | WO2020182261 | 9/2020 |

OTHER PUBLICATIONS

Machine translation of Alese et al (JP 2016198496A) dated Dec. 2016. (Year: 2016).

Machine translation of Cai (CN 202592652 U) dated Dec. 2012. (Year: 2012).

Machine translation of FR 2572324 A dated May 1986. (Year: 1986).

Office Action for U.S. Appl. No. 17/438,666, mailed on Nov. 30, 2023, Hansen, "A System for Manufacturing Mould-Based Equipment for Direct Injection Production of Footwear and a Method for Manufacturing Footwear", 9 pages.

Office Action for U.S. Appl. No. 17/438,854, mailed on Oct. 20, 2023, Mortensen, "Footwear Injection Mould", 8 Pages.

Office Action for U.S. Appl. No. 17/612,693, mailed on Nov. 7, 2023, Jakob Moller Hansen, "Footwear Last", 13 pages.

PCT Search Report for corresponding PCT Application No. PCT/DK2020/050235 dated Nov. 19, 2020, 4 pages.

Office Action for U.S. Appl. No. 17/438,717, mailed on Apr. 17, 2024, Hansen, "A System for Manufacturing Last-Based Equipment for Direct Injection Production of Footwear and a Method for Manufacturing Footwear," 9 pages.

Office Action for U.S. Appl. No. 17/438,778, mailed on May 16, 2024, Hansen, "A Moulding System for Direct Injection Manufacturing of Footwear," 12 pages.

Office Action for U.S. Appl. No. 17/468,854, mailed on May 9, 2024, Mortensen, "Footwear Injection Mould," 9 pages.

Office Action for U.S. Appl. No. 17/438,666, mailed on Jun. 6, 2024, Hansen, "A System for Manufacturing Mould-Based Equipment for Direct Injection Production of Footwear and a Method for Manufacturing Footwear ", 5 pages.

Office Action for U.S. Appl. No. 17/926,521, mailed on Jun. 7, 2024, Hansen, "A Last for Footwear Production ", 20 pages.

Genbao, Wen et al., "Practical Technology for Modern Injection Mold Structure Design", China Machine Press, May 2014, 4 pages.

Office Action for U.S. Appl. No. 17/438,717, mailed on Oct. 7, 2024, Hansen, "A System for Manufacturing Last-Based Equipment for Direct Injection Production of Footwear and a Method for Manufacturing Footwear", 7 Pages.

Office Action for U.S. Appl. No. 17/438,854, mailed on Nov. 27, 2024, Mortensen, "Footwear Injection Mould", 10 pages.

* cited by examiner

FOOTWEAR INJECTION MOULD

This Application claims priority to PCT Application No. PCT/DK2020/050235, filed Aug. 19, 2020, which claims priority to European Patent Application No. 19192265.7, filed Aug. 19, 2019, the contents of each of which is incorporated herein by reference.

TECHNICAL FIELD

A footwear injection mould for producing an article of footwear by direct injection moulding.

BACKGROUND

Articles of footwear can be produced in a number of different ways. In respect of attaching a sole assembly to an upper of a footwear, a known way is to cement a sole to the upper by the use of adhesives, while another way of doing this is via direct injection moulding, where the sole is directly moulded to the upper.

Direct injection moulding is traditionally carried out with use of a shoe injection mould manufactured from a block of metal, e.g. aluminium, where the mould may be cast or CNC cut to define a mould cavity (injection chamber) for forming the sole of the footwear. However, using shoe injection moulds of metal is relatively time consuming and expensive, as the equipment needed to produce these kinds of moulds are relatively expensive. Further, when a footwear manufacturer produces a new line of shoes, the shoe comes in a plurality of sizes, and needs to be produced in a right and a left version. This means that for one type of shoes, a large number of moulds have to be manufactured, as each size and orientation of shoe needs a separate mould. Accordingly, it may be relatively expensive to produce moulds for shoes, which means that vast amounts of shoes have to be produced and sold in order to justify the manufacturing of the moulds. This also means that if a limited range, a limited edition or a prototype line of a shoe is to be manufactured, where only a fraction of the number will be produced, the cost of the shoe has to be relatively high to pay for the production of the mould, in addition to the remaining cost of producing the shoe.

The costs of producing moulds can be lowered by 3D printing the moulds. By 3D printing the moulds as one unit, the moulds can withstand the wear and tear from repeatedly moulding a plurality of shoes, and can have a volume so that the structural integrity of the moulds are enough to withstand the expanding injected material without warping or deforming during use.

When injection moulding the sole of the footwear, the 3D printed mould closes around the upper of the sole in order to prevent the injected material from escaping the injection chamber of the mould. Thereby, the inner surface of the 3D printed mould defines the outer surface of the sole of the footwear. The closing of the 3D printed mould around the upper of the sole may be done by means of a protrusion of limited size, such as a lip, to optimize the esthetic appearance of the sole of the footwear.

However, 3D printed material currently used for forming the mould often comprises a polymeric material, for which reason the thermal conductivity of 3D printed mould may be relatively low, which means that it may be difficult and time consuming to heat the mould to a temperature sufficient for curing of the injected material to a degree, where the finish of the moulded product is as required. Further, when the protrusion comprises a polymeric material of limited size, the structural integrity of the protrusion is limited and decreases with an increase in temperature, which may result in the protrusion bending during the injection moulding of the sole so that the esthetic appearance of the sole is not as required.

Thus, there is a need for providing a footwear injection mould with a reduced manufacturing cost relative to traditional footwear moulds without compromising that the production quality of the article of footwear lives up to the standard of the manufacturer.

GENERAL DESCRIPTION

In accordance with the present description, there is provided a footwear injection mould, the footwear injection mould comprising a secondary injection mould defining at least part of an injection chamber for moulding a footwear part, said injection chamber comprises a proximal surface defining at least part of a distal surface of the footwear part, and where the secondary injection mould comprises at least one protrusion, where the at least one protrusion comprises an upper contacting surface for contacting an upper part of a footwear, a proximal end connected to the secondary injection mould, a primary surface faced away from the injection chamber, and a secondary surface faced towards the injection chamber, and where a normal of the upper contacting surface is configured to intersect a centre point of the upper contacting surface seen in a height direction, and where a protrusion plane is defined by the normal of the upper contacting surface along a width of the protrusion, said protrusion plane configured to define a boundary between a primary half and a secondary half of the protrusion, the primary half arranged between the protrusion plane and the primary surface and the secondary half arranged between the protrusion plane and the secondary surface, and where a height of the proximal end of the protrusion is larger than the height of the upper contacting surface of the protrusion, relative to the normal of the upper contacting surface.

Within the present description, the term "footwear injection mould" may be understood as an injection mould configured for forming a part of a footwear. A part of a footwear may be an upper, an inner sole, a part of a sole, such as a layer of a sole, the entire of a sole, etc. The footwear injection mould may be configured for forming the part of the footwear directly on another part of a footwear or, alternatively, as a separate part for subsequent attachment to another part of a footwear.

Within the present description, the term "normal of the upper contacting surface" may be understood as a vector orthogonal to the upper contacting surface. The normal may be seen as a normal axis and/or part of a plane, where the normal intersects the plane. The normal may be a normal to a tangent, in case the relevant part of the upper contacting surface is curved.

Within the present description, the term "height" may be understood as the height, e.g. of the upper contacting surface or the proximal end, in a direction orthogonal to the normal of the upper contacting surface and/or to a normal of the proximal end of the protrusion, and/or to a vertical plane of the footwear injection mould.

Providing a footwear injection part comprising a protrusion for contacting an upper part of a footwear ensures that an effective seal between an injection chamber defined by a secondary injection mould and the surroundings is provided and, further, that the esthetic appearance of the sole can be as required due to the limited size and/or width of the protrusion, compared to merely using part of a surface of the secondary injection mould for providing a seal.

Further, by providing a protrusion where a height of the proximal end of the protrusion is larger than the height of the upper contacting surface of the protrusion, the amount of material of the protrusion, such as the width and/or the cross-sectional area and/or the density, at the connection between the protrusion and the secondary injection mould is increased, which increases the structural strength and stability of the protrusion.

The resistance of the protrusion against bending and/or moving when being exposed to stress (e.g. from expanding injected material in the mould) decreases with an increase in temperature. However, by increasing the amount of material at the proximal end of the protrusion (e.g. an increase in width, cross-sectional area, density, mass and/or volume), the ability of the protrusion to resist bending or moving is increased.

Hence, by the present invention it is achieved that an improved and effective seal is provided by the protrusion and that the protrusion, due to the increased amount of material at the proximal end, has an increased structural strength, which is desired due to the relatively high temperature of the material.

In an embodiment, at least part of the upper contacting surface can be planar.

Accordingly, part of the upper contacting surface may be planar, and/or the entire upper contacting surface may be planar.

In an embodiment, at least part of the upper contacting surface can be curved.

Accordingly, part of the upper contacting surface may be curved, and/or the entire upper contacting surface may be curved.

In an embodiment, the protrusion can have a length defined by the distance from the upper contacting surface to the proximal end along the normal of the upper contacting surface, and where the difference between the height of the proximal end and said length can be less than the difference between the height of the upper contacting surface and said length.

In an embodiment, the height of the proximal end of the protrusion can be at least two times larger than the height of the upper contacting surface of the protrusion, relative to the normal of the upper contacting surface.

In an embodiment, the height of the proximal end of the protrusion can be at least three times larger than the height of the upper contacting surface of the protrusion, relative to the normal of the upper contacting surface.

Thereby, the surface area of contact between the protrusion and the upper part of the footwear is kept low to facilitate a tight seal between the injection chamber and the surroundings, while the contact between the protrusion and the secondary injection mould is kept high to prevent deformation (bending) of the protrusion e.g. due to expanding injection material.

In an embodiment, the primary half of the protrusion can comprise the majority of the volume and/or the mass of the protrusion.

Thereby, the protrusion is primarily prevented from bending towards its primary surface than towards its secondary surface, as the majority of the volume and/or the mass of the protrusion is arranged at the primary surface and, therefore, a larger volume and/or amount of mass has to be removed and/or deformed in order for the protrusion to be bend towards its primary surface.

Further, the proximal surface of the injection chamber defining at least part of the distal surface of the footwear part (e.g. of the shape of a sole of a shoe) is usually predefined by esthetic requirements. Accordingly, usually, there is not room for arranging a large mass or volume in the secondary half of the protrusion, as this would limit the design options of the distal surface of the footwear part.

In an embodiment, the primary half of the protrusion can comprise at least 50%, at least 60%, at least 70%, at least 80%, or at least 90% of the volume of the protrusion.

Hereby, advantages as mentioned above concerning e.g. increasing the protrusion's resistance to bending towards its primary surface may be achieved due to the at least equal volume or larger volume being arranged at the primary half, e.g. at or near the primary surface. To this may be added the advantage that the primary surface may be designed with e.g. few restrictions only, thereby making it relatively easy to arrange a larger volume at the primary half than at the secondary half, since the secondary surface defines e.g. the shape of part of the sole, which thus is binding for the options of rearranging the secondary surface and consequently the volume of the secondary half.

In an embodiment, the secondary surface of the protrusion can define an upper part of the injection chamber.

In an embodiment, the secondary surface of the protrusion can extend from a side wall of the injection chamber to the upper contacting surface of the protrusion.

In an embodiment, the primary half of the protrusion can comprise at least 50%, at least 60%, at least 70%, at least 80%, or at least 90% of the mass of the protrusion.

By providing that the primary half of the protrusion may comprise at least 50%, at least 60%, at least 70%, at least 80%, or at least 90% of the volume and/or the mass of the protrusion, along with the height of the proximal end of the protrusion may be larger than the height of the upper contacting surface of the protrusion, both the height and the mass and/or volume of the protrusion resist a bending and/or move of the protrusion towards the primary surface of the protrusion.

In an embodiment, the secondary injection mould can comprise more than one protrusion at least partly contacting the upper part of the footwear.

In an embodiment, the at least one protrusion can form a ridge at least partly contacting the upper part of the footwear, and where the protrusion plane of the at least one protrusion can form a continuous plane along the ridge.

The ridge may at least partly contact the upper part of the footwear.

The ridge may form a closed path, where the ridge at the closed path may contact the upper part of the footwear, whereby the contact between the ridge and the upper part seal off the injection chamber from the surroundings.

In an embodiment, the height of the upper contacting surface of the protrusion may be in excess of 2 mm, e.g. in the interval between 2 to 6 mm, in the interval between 3 and 5 mm, or even more specifically around 4 mm.

Hereby, bending, deforming or warping of the upper contacting surface or of the protrusion may be avoided during injection, e.g. in case the mould is 3D printed from polymeric material.

In an embodiment, the footwear injection mould can be for forming a sole of a footwear.

Accordingly, by contacting an upper part of a footwear, the sole of the footwear may be formed by the injection mould and, simultaneously, be attached directly on the upper of the footwear. Thereby, a less time-consuming process of attaching a sole to a footwear is provided compared to attaching the sole by means of e.g. an adhesive.

In an embodiment, the footwear part can be a shoe sole.

This means that the secondary injection mould may define a medial side, a lateral side, a forefoot side, a heel side and/or a bottom side of the sole. Thus, the secondary injection mould may define at least part of the outer surface of a sole for an article of a footwear.

In an embodiment, the secondary injection mould can comprise a polymeric material.

A polymeric material may refer to a natural or a synthetic polymer. A polymeric material may be a plastic material.

Thereby, the secondary injection mould may be made partly of a polymeric material. Alternatively, the secondary injection mould may be made completely of a polymeric material.

A polymeric material is a relatively inexpensive material. Therefore, by providing a secondary injection mould comprising a polymeric material, the secondary injection mould may be produced at a relatively low-cost compared to e.g. providing a secondary injection mould comprising a metal. Thereby, the costs of producing footwear with use of a mould comprising a polymeric material may be lower than producing footwear with use of a mould comprising a metal. Further, as a result of the lower cost of the secondary injection mould, a larger number of moulds may be produced and/or moulds only intended for moulding a low number of footwear parts (e.g. for a limited-edition footwear) may be produced.

In an embodiment, the at least one protrusion can be configured to seal the injection chamber from the surroundings.

The at least one protrusion may refer to a tip, spike, cone, ridge or similar.

In case the at least one protrusion is a ridge, the at least one protrusion may be configured to contact the upper part of a footwear at one surface area. The one surface area may be an elongated surface area, stretching continuously along a closed path on the outer surface of the upper part of the footwear, so that the at least one protrusion may be configured to seal the injection chamber from the surroundings.

In case the secondary injection mould comprises more than one protrusion, such as tips, spikes, cones, the more than one protrusion may be configured to contact the upper part of the footwear at more than one point. Advantageously, the more than one protrusion may form a closed path on the outer surface of the upper part of the footwear, so that the more than one protrusion may be configured to seal the injection chamber from the surroundings.

In an embodiment, the at least one protrusion can be configured to seal at least partly against an upper of a shoe, when the footwear injection mould is in its closed state.

Thereby, the footwear injection mould may be configured to form a sole of a shoe, which sole is formed directly on the upper of the shoe. Therefore, the sole of the shoe does not have to be attached to the upper of the shoe after moulding, e.g. by use of an adhesive, by welding or by any other know technique, which would increase the time-consumption and difficulty of producing the footwear.

In an embodiment, the secondary injection mould can be 3D printed.

Accordingly, the secondary injection mould may be produced by layers of material being fused together in a layered structure to create a 3D shaped secondary injection mould. Providing the secondary injection mould as an additive manufactured part, the primary injection mould may be utilized to provide support and rigidity to the secondary injection mould.

Additive manufacturing is a time-consuming manufacturing process, where a printing head adds a layer of polymeric material one layer at a time, where the positioning of the material is controlled by a computer or a controller, and where layers are stacked on top of each other. The manufacturing time may therefore be dependent on the choice of material, the curing time and the speed of the 3D printer (additive manufacturing device). Furthermore, the cost of a 3D printer is significantly lower than the cost of the manufacturing equipment for traditional footwear injection moulds, which means that the tooling time for a 3D printed secondary injection mould is much less expensive than for a traditional mould (e.g. a CNC cutter). Thus, the present disclosure provides both a reduction in time as well as cost for the production of a footwear injection mould, as well as a reduction in turnover time when a new set of mould is to be provided for a manufacturing site.

In an embodiment, the protrusion can be an integral part of the secondary injection mould.

The secondary injection mould and the at least one protrusion may be produced as one unit, e.g. by 3D printing the secondary injection mould including the protrusion. The secondary injection mould and the protrusion may alternatively be produced as two separate parts and be joined (e.g. fused or joined by adhesive) to be one unit. Thereby, a solid connection between the protrusion and the secondary injection mould is provided.

In an embodiment, the footwear injection mould can further comprise a primary injection mould, where the secondary injection mould may be configured to be fixed relative to the primary injection mould.

By providing a two part footwear injection mould, the manufacturing time of the secondary injection mould may be reduced considerably, as a large part of the footwear mould is a generic part that can receive one or more secondary injection moulds, where the secondary injection moulds define the injection chamber of the footwear injection mould, while the primary injection mould may provide the structural stability of the mould.

By providing the footwear injection mould consisting of a primary injection mould and a secondary injection mould, the size of the secondary injection mould may be reduced compared to traditional footwear moulds. The reduction in size and/or volume results in a quicker production and a reduction in material used. Material that is used for 3D printing is often relatively expensive. Thus, by reducing the size of the secondary injection mould it has been found that a complete set of secondary injection moulds for a particular series of footwear, which may be e.g. 8 sizes and moulds for the right foot and the left foot, may be provided at a much reduced time relative to a traditional footwear mould.

In an embodiment, the primary injection mould can have a higher thermal conductivity than the secondary injection mould.

During the injection manufacturing process, the injection moulding equipment heats up the footwear injection mould to a predetermined temperature. The temperature of the mould may affect the curing process of the injected material and a too low temperature may lead to flaws in the surface of the injected material. The primary injection mould may have a volume that is larger than the secondary injection mould, and where the secondary injection mould may be connected to the primary injection mould during the manufacturing process, the primary injection mould may be used to transfer heat to the secondary injection mould. Thus, in order to improve the heat transfer from the primary injection mould to the secondary injection mould, the primary mould may be adapted to transfer heat quickly from the manufacturing equipment to the secondary injection mould, as the secondary injection mould may be replaced during manufacturing meaning that the replaced secondary injection mould should be quickly heated to the required temperature.

Thus, by having a primary injection mould with a higher thermal conductivity than the secondary mould, the turnover time may be reduced when replacing one secondary injection mould with another injection mould.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

BRIEF DESCRIPTION OF THE DRAWINGS

The following is an explanation of exemplary embodiments with reference to the drawings, in which.

DETAILED DESCRIPTION

Figure 1:
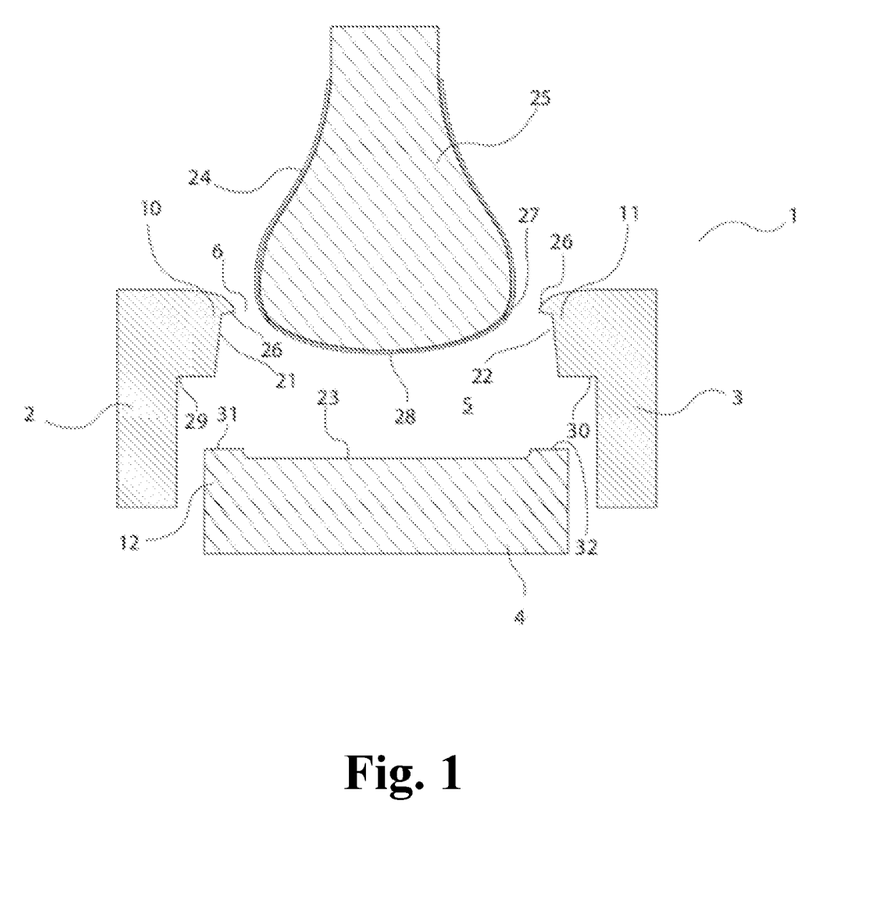
FIG. 1 shows an embodiment of a cross-sectional view of a footwear injection mould before being connected to an upper part of a footwear.

FIG. 1 shows an embodiment of a cross-sectional view of a footwear injection mould 1 in accordance with the present disclosure, where the cross-sectional plane is a vertical plane that may be seen as being perpendicular to the longitudinal axis of the footwear injection mould.

The footwear injection mould 1 comprises a first side mould 2, a second side mould 3, and a first bottom mould 4. The footwear injection mould 1 in FIG. 1 is in an open state, where the first side mould 2, the second side mould 3 and the first bottom mould 4 are spaced apart, allowing access to the injection chamber 5 from one or more positions, such as from the upper opening 6. The first side mould 2, the second side mould 3, and the first bottom mould 4 are provided with attachment parts (not shown) that allow the side moulds 2, 3 and the bottom mould 4 to be attached to an injection moulding equipment (not shown). The attachment to the injection moulding equipment may be adapted to transfer heat from the injection moulding equipment to the side moulds 2, 3 and the bottom mould 4 so that the footwear injection mould can be warmed up to a predefined temperature to optimize the injection moulding of the footwear part in the injection chamber 5.

The first side mould 2, a second side mould 3, and a first bottom mould 4 may be adapted to provide an injection chamber 5, as a first side inner surface 21 of a first inner part 10, a second side inner surface 22 of a second inner part 11 and a third bottom inner surface 23 of a third inner part 12 provide an outer surface of the element to be moulded inside the injection chamber 5. The upper part of the injection chamber 5 may be delimited by an upper part 24 of a footwear, which may be mounted on a last 25, where the last 25 fixes the upper part 24 of the footwear relative to the injection chamber 5.

The first side mould 2 and the second side mould 3 may be provided with a first 29 and a second contact surface 30 positioned on a bottom part of the first inner part 10 of the first side mould 2 and the second inner part 11 of the second side mould 3, respectively, which may be adapted to abut a first 31 and a second 32 upper contact surface of the third inner part 12 the first bottom mould 4. The contact surfaces 29, 30, 31, 32 may be adapted to close off the injection chamber 5 between the side moulds 2, 3 and the bottom mould 4. The contact surfaces 29, 30, 31, 32 may extend from a front end (toe end) of the secondary injection mould towards its back end (heel end). Furthermore, the first side mould 2 and the second side mould 3 may have a third and/or a fourth contact surface (not shown).

FIG. 1 shows that the last 25 has been introduced into the injection chamber 5, allowing a bottom part 28 of the upper part 24 of the footwear to be exposed to the injection chamber 5. The last 25 may be moveable in a vertical direction in and out of the injection chamber 5, so that when the footwear part has been moulded to the upper part 24, the last 25 and the upper part 24 of the footwear may be maneuvered away from the injection chamber 5, so that the next last and next upper part may be introduced into the injection chamber 5.

Furthermore, the first side mould 2 and the second side mould 3 are provided with a protrusion 26, where the protrusion 26 has a shape that is adapted to follow an outer surface 27 of the upper part 24. When the protrusion 26 is pushed into contact with the outer surface 27 of the upper part 24, the protrusion 26 may close off the injection chamber 5 together with said outer surface 27, and assist in preventing injection material (not shown), which is introduced into the injection chamber 5, from escaping the injection chamber 5 via the upper opening 6 of the injection chamber 5.

Figure 2A:
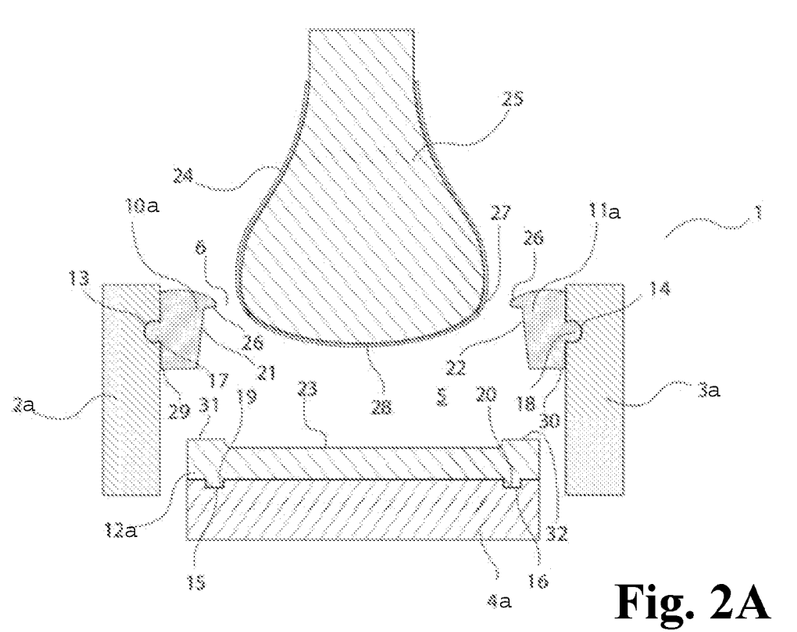
FIG. 2A shows an embodiment of a cross-sectional view of a footwear injection mould, comprising a primary injection mould and a secondary injection mould, before being connected to an upper part of a footwear.

FIG. 2A shows an embodiment of a cross-sectional view of a footwear injection mould 1, comprising a primary injection mould and a secondary injection mould, before being connected to an upper part of a footwear.

In FIG. 2A, the side moulds and the bottom mould of the footwear injection mould 1 of FIG. 1 each comprise two moulds. Accordingly, a first side mould may comprise a first primary side mould 2a and a first secondary side mould 10a, the second side mould may comprise a second primary side mould 3a and a second secondary side mould 11a, and a first primary bottom mould 4a and a first secondary bottom mould 12a. The first primary side mould 2a, the second primary side mould 3a, and the first primary bottom mould 4a may be provided with a first secondary side mould 10a, a second secondary side mould 11a, and a first secondary bottom mould 12a, respectively, where the secondary side moulds 10a, 11a and the secondary bottom mould 12a may be coupled to the primary side moulds 2a, 3a, and the primary bottom mould 4a.

The primary side moulds 2a, 3a and the primary bottom mould 4a may be provided with first coupling elements 13, 14, 15, 16 that are adapted to mate with second coupling elements 17, 18, 19, 20 that allow the secondary side moulds 10a, 11a and the secondary bottom mould 12a to be coupled to the primary side moulds 2a, 3a and the primary bottom mould 4a. The coupling elements may be adapted to hold the secondary side moulds 10a, 11a and the secondary bottom mould 12a relative to the primary side moulds 2a, 3a and the primary bottom mould 4a during the injection moulding process, ensuring that the secondary side moulds 10a, 11a and the secondary bottom mould 12a are held in position while the footwear injection mould 1 is moved from its open position, as shown in FIG. 1 towards its closed position and during the injection moulding process, as shown in FIG. 2B.

In FIG. 2A, it may be the secondary side moulds 10a, 11a and the secondary bottom mould 12a that may be adapted to provide an injection chamber 5, as the first side inner surface 21, the second side inner surface 22 and the third bottom inner surface 23 provide an outer surface of the element to be moulded inside the injection chamber 5. The upper part of the injection chamber 5 may be delimited by an upper part 24 of a footwear, which may be mounted on a last 25, where the last 25 fixes the upper part 24 of the footwear relative to the injection chamber 5.

The first secondary side mould 10a and the second secondary side mould 11a may be provided with the first 29 and the second contact surface 30 positioned on the bottom part of the first secondary side mould 10a and the second secondary side mould 11a, respectively, which may be adapted to abut the first 31 and the second 32 upper contact surface of the first secondary bottom mould 12a. The contact surfaces 29, 30, 31, 32 may be adapted to close off the injection chamber 5 between the secondary side moulds 10a, 11a and the secondary bottom mould 12a. The contact surfaces 29, 30, 31, 32 may extend from a front end (toe end) of the secondary injection mould towards its back end (heel end). Furthermore, the first secondary side mould 10a and the second secondary side mould 11a may have third and/or a fourth contact surface (not shown).

Figure 2B:
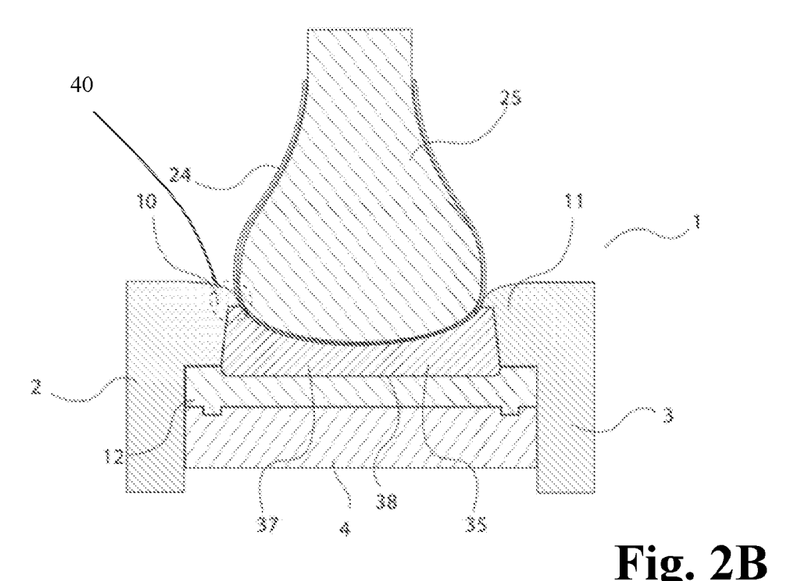
FIG. 2B shows an embodiment of a cross-sectional view of a footwear injection mould, where a footwear part is moulded.

FIG. 2B shows an embodiment of a cross-sectional view of a footwear injection mould 1, where a footwear part is moulded.

FIG. 2B shows that an injected material 35 has expanded to fill out the entire volume of the injection chamber 5. Accordingly, the injected material 35 comes into contact with the inner surfaces 21, 22, 23 (as shown in FIG. 2A) of the first side mould 2, the second side mould 3, and the first bottom mould 4 (forming the secondary injection mould), respectively, causing the outer surface 38 of the injected material 35 to take the shape of the inner surfaces 21, 22, 23 of the secondary injection mould (and the outer surface of the injection chamber 5), to form a footwear sole 37. As illustrated in FIG. 2A, the injected material may also come into contact with the inner surfaces 21, 22, 23 (as shown in FIG. 2A) of the first secondary side mould 10a, the second secondary side mould 11a, and the first secondary bottom mould 12a (forming the secondary injection mould).

When the injected material 35 has cured, the first side mould 2 and the second side mould 3 may be moved horizontally and the first bottom mould 4 may be moved vertically away from the footwear sole 37, thereby opening the footwear injection mould 1.

In FIG. 2B, the protrusion 26 is pushed into contact with the outer surface 27 of the upper part 24. Thereby, the protrusion 26 closes off (seals off) the injection chamber 5 together with the bottom part 28 of the upper part 24, and assists in preventing that injected material 35 (which is introduced into the injection chamber 5) from escaping the injection chamber 5 via the upper opening 6 of the injection chamber 5. The protrusion 26 may have a shape that is adapted to follow the outer surface 27 of the upper part 24.

Figure 3:
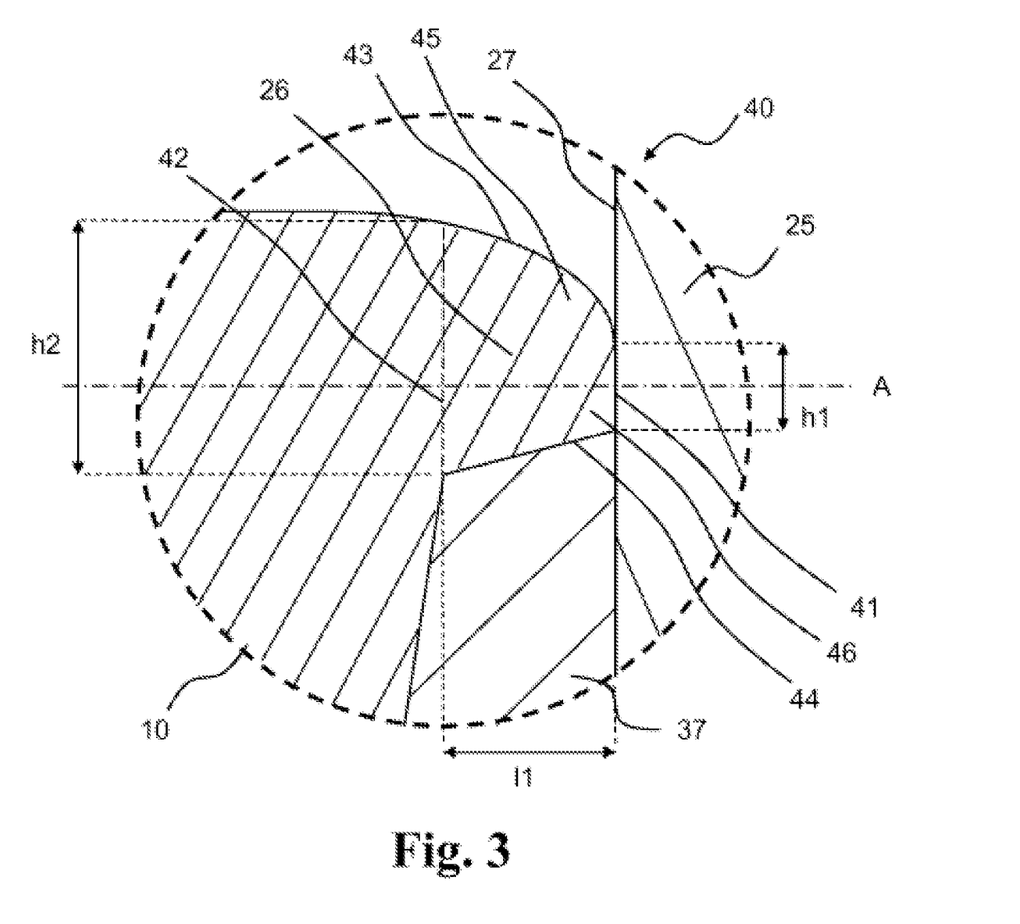
FIG. 3 shows a cut-out of the embodiment of FIG. 2.

FIG. 3 shows a cut-out of the embodiment of FIG. 2B.

In FIG. 3, the cut-out 40 of the embodiment of FIG. 2B shows the protrusion 26 contacting the outer surface 27 of the upper part 24 of the footwear. The protrusion 26 may have a shape that is adapted to follow the outer surface 27 of the upper part 24. The protrusion 26 may be a ridge.

The shape of the protrusion 26 and of said outer surface 27 are shown to be flat and to extend in a vertical plane. Obviously, the protrusion 26 and the outer surface 27 may have various other shapes, such as rough, bend, curvilinear.

The at least one protrusion 26 may comprise an upper contacting surface 41 for contacting the outer surface 27 of an upper part 24 of a footwear, a proximal end 42 connected to the secondary injection mould (the first secondary side mould 10), a primary surface 43 faced away from the injection chamber 5, and a secondary surface 44 faced towards the injection chamber 5.

The at least one protrusion 26 may have a height h2 at the proximal end 42 of the protrusion 26 that is larger than the height h1 at the upper contacting surface 41 of the protrusion 26, relative to a normal A of the upper contacting surface 41. The normal A of the upper contacting surface 41 is configured to intersect a centre point of the upper contacting surface 41 seen in the height direction. A protrusion plane is defined by the normal A of the upper contacting surface 41 along a width of the protrusion 26, said protrusion plane configured to define a boundary between a primary half 45 and a secondary half 46 of the protrusion 26, the primary half 45 arranged between the protrusion plane and the primary surface 43 and the secondary half 46 arranged between the protrusion plane and the secondary surface 44.

The at least one protrusion 26 has a length l1 defined by the distance from the upper contacting surface 41 to the proximal end 42 along the normal A of the upper contacting surface 41.

In one example, the height h1 may be in the region between 2 to 6 mm, where the height may more specifically be between 3 and 5 mm, or even more specifically around 4 mm. The height h1 of the upper contacting surface has been shown as being above 2 mm, as a lower thickness may cause the material to bend, deform or warp during injection. This may especially be in a situation where the mould is 3D printed from a polymeric material. In comparison, traditional moulds, made out of aluminum or other metal substances may have an upper contacting surface height h1 that is around 1.5 mm.

In one example, the height h2 may be between 6 and 15 mm, where the height may more specifically be between 7 and 12 mm, where the height may more specifically be between 8 and 10 mm. The increased height h2 provides support to the protrusion (lip) especially when the material is 3D printed from a polymeric material. In comparison, traditional moulds made out of aluminium or other metal substances may have a height h2 that is close to 2-3 mm.

In one embodiment the size ratio between the height h1 and h2 may be around 1:2, where h2 may be twice the height of h1. In one embodiment the size ratio may be around 1:1.5, where the height h2 is 50% larger than h1.

In one exemplary embodiment the length of the protrusion l1 may have size that is at least larger than the height h2, i.e. that the length ratio between the length of the protrusion vs. the height h2 is at least 1:1. In another embodiment the length of the protrusion may have a size that is smaller than the height h2, i.e. l1<h2. Thus, the height h2 provides support for the length of the protrusion, where the height h2 of the protrusion may have to be increased when the length l1 is increased.

Figure 4A:
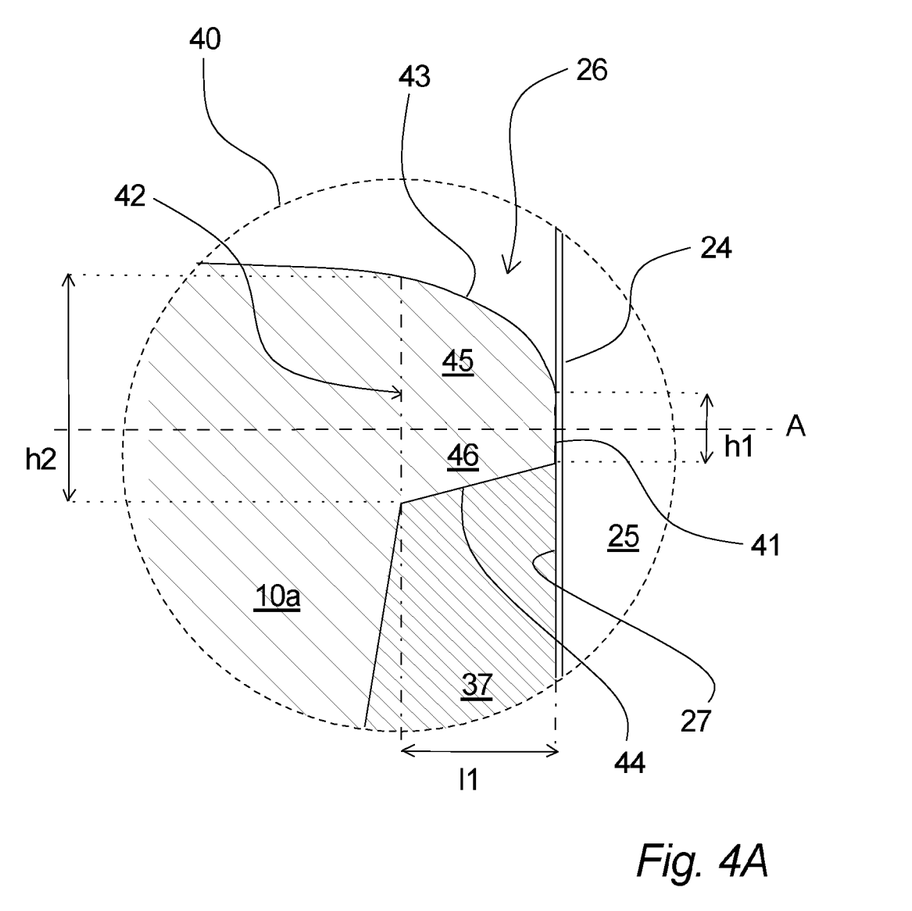
FIGS. 4A-D show various examples of cut-outs corresponding to FIG. 3.

FIGS. 4A-D show various examples of cut-outs corresponding to FIG. 3, but where the protrusion 26 has been arranged in various manners within the scope of the present invention. Thus, in particular the primary surface 43 has been rearranged while still maintaining that the height h2 of the proximal end of the protrusion is larger than the height h1 of the upper contacting surface of the protrusion. FIG. 4A shows a primary surface 43, which resembles the primary surface shown in FIG. 3 and where the primary half 45 clearly is larger than the secondary half 46 so that the primary half 45 comprises the majority of the volume of the protrusion 26.

Figure 4B:
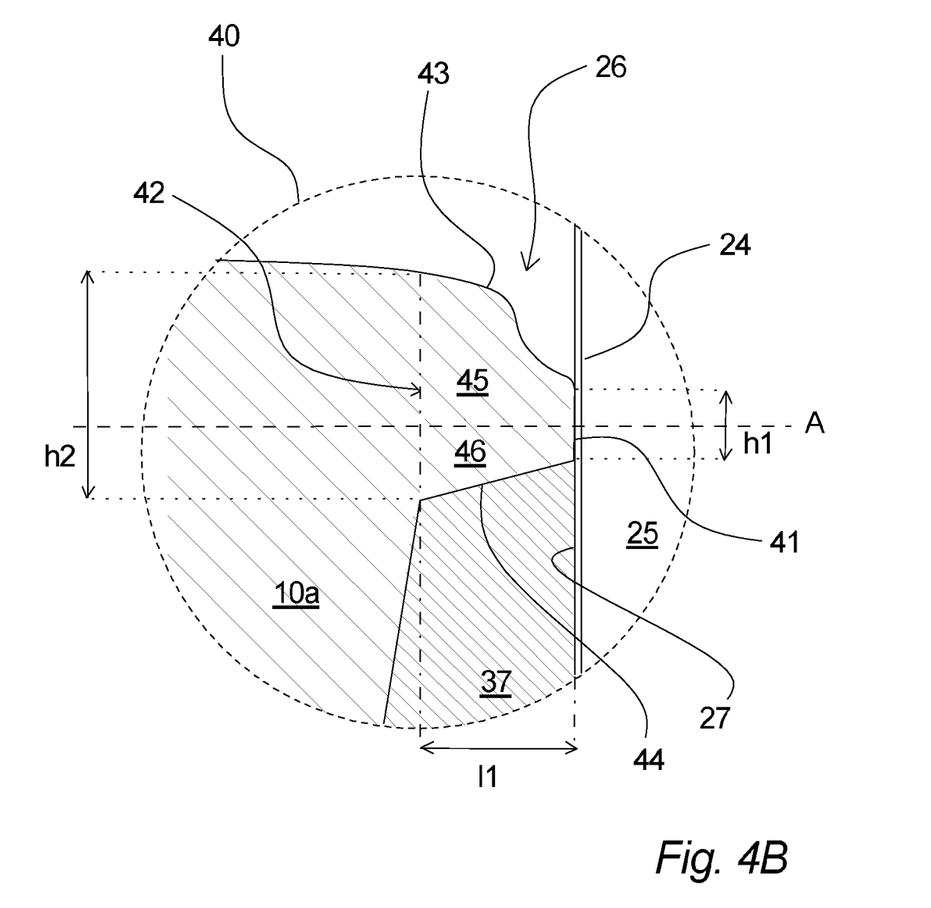

In FIG. 4B the primary surface 43 has been amended to have a larger portion of its volume nearer to the proximal end 42, e.g. with a slimmer form near the upper contacting surface 41, while still maintaining that the primary half 45 comprises the majority of the volume of the protrusion 26.

Figure 4C:
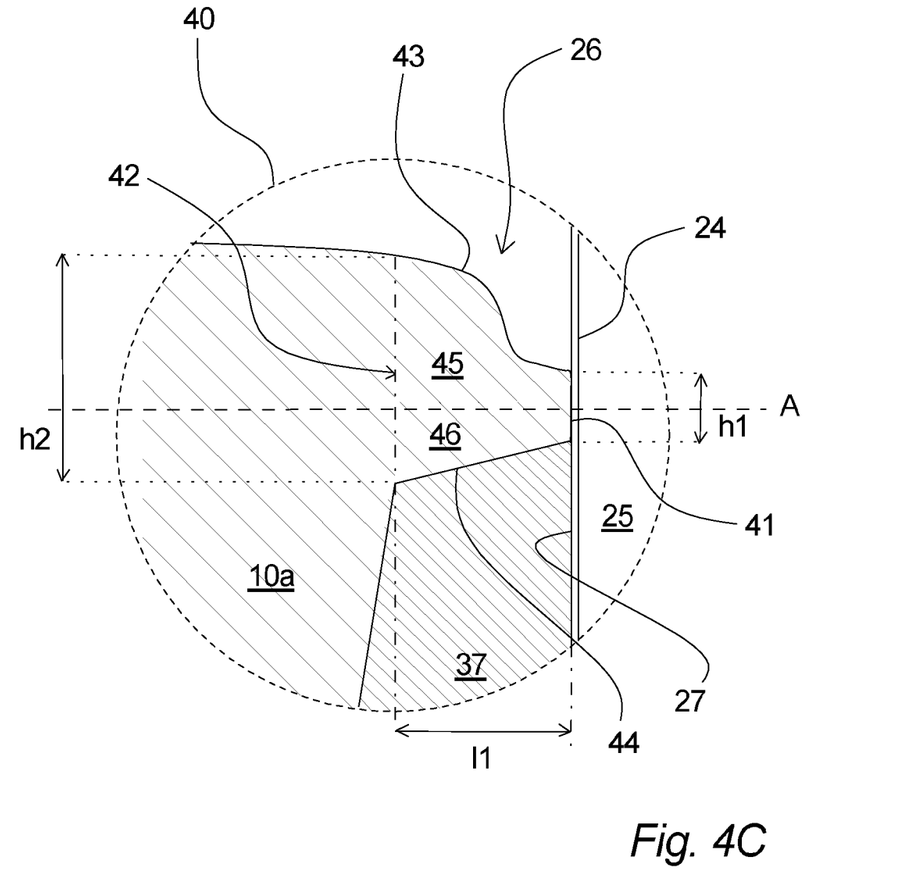

In FIG. 4C the primary surface 43 has been amended even more to have a larger portion of its volume nearer to the proximal end 42, e.g. with a slimmer form near the upper contacting surface 41, while still maintaining that the primary half 45 comprises the majority of the volume of the protrusion 26.

Figure 4D:
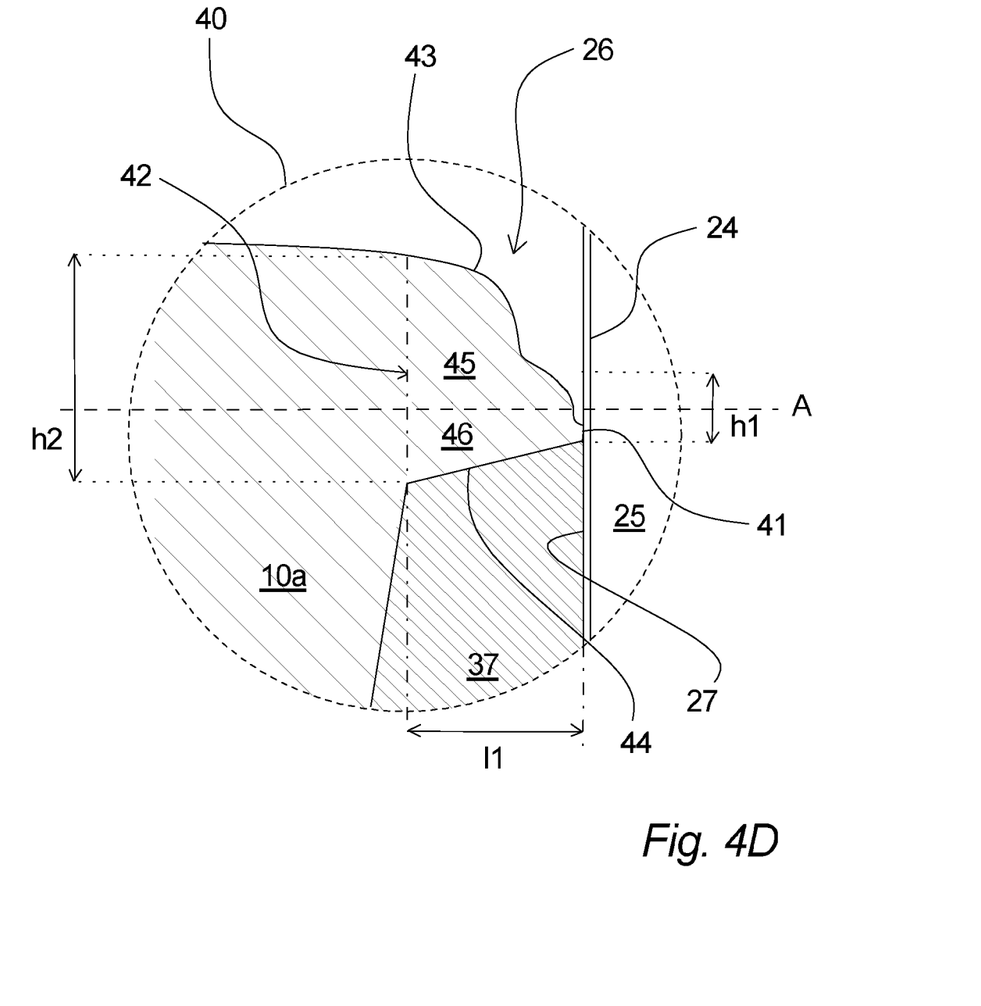

In FIG. 4D the primary surface 43 has been amended to have a slimmer form nearer the upper contacting surface 41, than illustrated in FIG. 4C, while still maintaining that the height h2 of the proximal end of the protrusion larger than the height h1 of the upper contacting surface of the protrusion. The protrusion 26 forms a ridge, at tip or a similar shaped form where it is contacting and sealing against the upper part 24 and above this ridge, tip or the like the protrusion is formed to be very close to the surface of the upper part 24, whereby the protrusion is provided with additional material to provide the ridge itself with an increased strength, e.g. to withstand the stress from e.g. the moulding material and thereby prevent that the ridge for example warps, bends or deforms in any other way. Thus, an effective seal is furthermore provided. It is noted that the height of the ridge itself may be as little as 1.6 mm and have an actual contact height of as little as 1.1 mm.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCE NUMBERS

1. Footwear injection mould
2. First side mould
2a. First primary side mould
3. Second side mould
3a. Second primary side mould
4. First bottom mould
4a. First primary bottom mould
5. Injection chamber
6. Upper opening
10. First inner part
10a. First secondary side mould
11. Second inner part
11a. Second secondary side mould
12. Third inner part
12a. First secondary bottom mould
13. First coupling element for first primary side mould
14. First coupling element for second primary side mould
15. First coupling element for first primary bottom mould
16. Further first coupling element for first primary bottom mould
17. Second coupling element for first secondary side mould
18. Second coupling element for second secondary side mould
19. Second coupling element for first secondary bottom mould
20. Further second coupling element for first secondary bottom mould
21. First side inner surface
22. Second side inner surface
23. Third bottom inner surface
24. Upper part
25. Last
26. Protrusion
27. Outer surface
28. Bottom part
29. First contact surface
30. Second contact surface
31. First upper contact surface
32. Second upper contact surface
35. Injected material
37. Footwear sole
38. Outer surface
40. Cut-out
41. Upper contacting surface
42. Proximal end
43. Primary surface 44. Secondary surface
45. Primary half
46. Secondary half
h1 Height upper contacting surface
h2 Height the proximal end
l1 Length
A Normal

The invention claimed is:

1. A footwear injection mold comprising:
a primary injection mold including:
   a first side mold,
   a second side mold, and
   a bottom mold; and
a secondary injection mold configured to be fixed relative to the primary injection mold, the secondary injection mold defining at least part of an injection chamber for molding a footwear part, said injection chamber comprises a proximal surface defining at least part of a distal surface of the footwear part, and where the secondary injection mold comprises at least one protrusion, where the at least one protrusion comprises an upper contacting surface for contacting an upper part of a footwear, a proximal end connected to the secondary injection mold, a primary surface faced away from the injection chamber, and a secondary surface faced towards the injection chamber, and where a normal of the upper contacting surface is configured to intersect a center point of the upper contacting surface seen in a height direction, and where a protrusion plane is defined by the normal of the upper contacting surface along a width of the at least one protrusion, said protrusion plane configured to define a boundary between a primary half and a secondary half of the at least one protrusion, the primary half arranged between the protrusion plane and the primary surface and the secondary half arranged between the protrusion plane and the secondary surface, and where a height of the proximal end of the at least one protrusion is larger than a height of the upper contacting surface of the at least one protrusion, relative to the normal of the upper contacting surface,
wherein the primary half of the at least one protrusion includes a majority of a volume and/or a mass of the at least one protrusion.

2. The footwear injection mold according to claim 1, wherein the at least one protrusion has a length defined by a distance from the upper contacting surface to the proximal end along the normal of the upper contacting surface, and
where a difference between the height of the proximal end and said length is less than a difference between the height of the upper contacting surface and said length.

3. The footwear injection mold according to claim 1, wherein the height of the proximal end of the at least one protrusion is at least two times larger than the height of the upper contacting surface of the at least one protrusion, relative to the normal of the upper contacting surface.

4. The footwear injection mold according to claim 1, wherein the height of the proximal end of the at least one protrusion is at least three times larger than the height of the upper contacting surface of the at least one protrusion, relative to the normal of the upper contacting surface.

5. The footwear injection mold according to claim 1, wherein the primary half of the at least one protrusion comprises at least 50% of a volume of the at least one protrusion.

6. The footwear injection mold according to claim 1, wherein the secondary surface of the at least one protrusion extends from a side wall of the injection chamber to the upper contacting surface of the at least one protrusion.

7. The footwear injection mold according to claim 1, wherein the primary half of the at least one protrusion comprises at least 50% of a mass of the at least one protrusion.

8. The footwear injection mold according to claim 1, wherein the at least one protrusion includes a plurality of protrusions, and
wherein the plurality of protrusions at least partly contact the upper part of the footwear.

9. The footwear injection mold according to claim 1, wherein the at least one protrusion is forming a ridge at least partly contacting the upper part of the footwear, and
where the protrusion plane of the at least one protrusion is forming a continuous plane along the ridge.

10. The footwear injection mold according to claim 1, wherein the height of the upper contacting surface of the at least one protrusion is in excess of 2 mm.

11. The footwear injection mold according to claim 1, wherein the footwear injection mold is for forming a sole of the footwear.

12. The footwear injection mold according to claim 1, wherein the secondary injection mold comprises a polymeric material.

13. The footwear injection mold according to claim 1, wherein the at least one protrusion is configured to seal the injection chamber from a surrounding environment.

14. The footwear injection mold according to claim 1, wherein the at least one protrusion is configured to seal at least partly against an upper of a shoe, when the footwear injection mold is in a closed state.

15. The footwear injection mold according to claim 1, wherein the secondary injection mold is 3D printed.

16. The footwear injection mold according to claim 1, wherein the at least one protrusion is an integral part of the secondary injection mold.

17. The footwear injection mold according to claim 10, wherein the height of the upper contacting surface of the at least one protrusion is in an interval between 2 to 6 mm.

18. The footwear injection mold according to claim 1, wherein the primary injection mold has a higher thermal conductivity than the secondary injection mold.

* * * * *